Feb. 10, 1925.
C. T. OLSON
1,526,008
BALL BEARING
Filed June 23, 1924
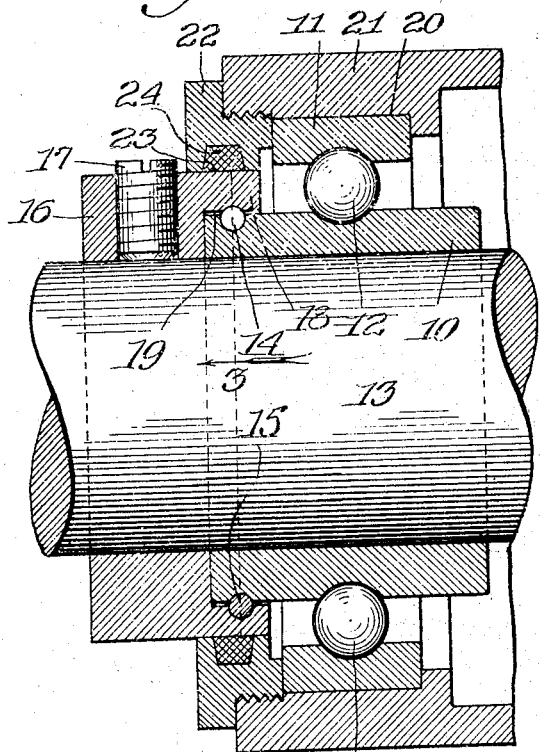
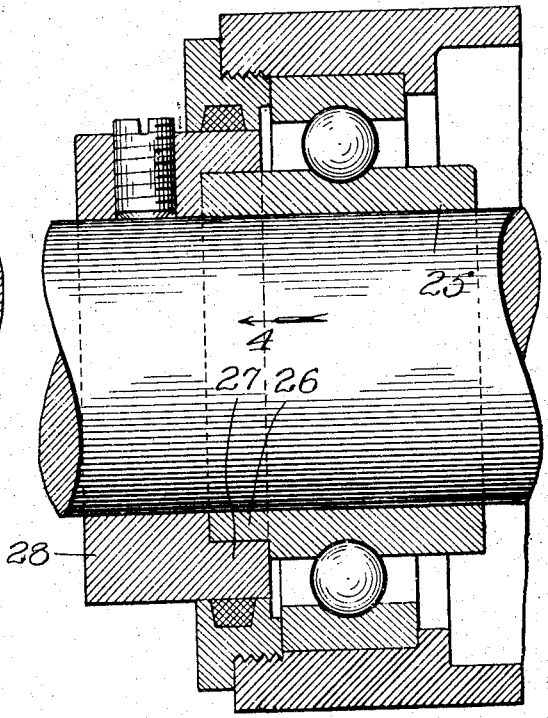
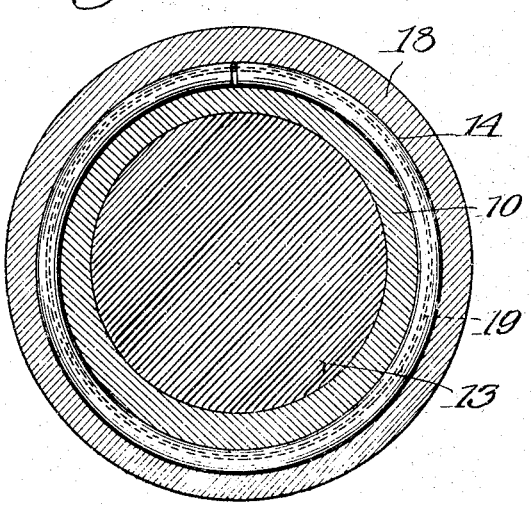
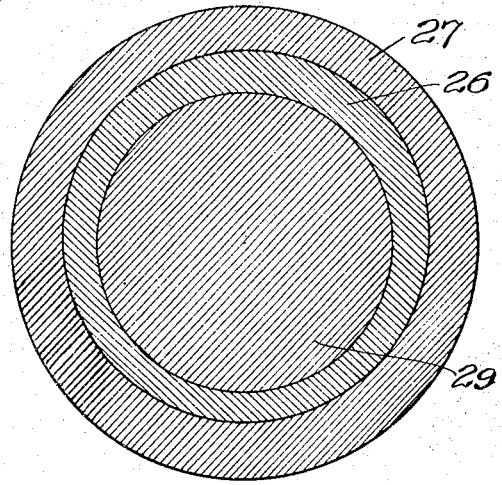
Inventor:
Clarence T. Olson,
By Dyrenforth, Lee, Chritton and Wiles,
Attys.

Patented Feb. 10, 1925.

1,526,008

UNITED STATES PATENT OFFICE.

CLARENCE T. OLSON, OF CHICAGO, ILLINOIS, ASSIGNOR TO STROM BALL BEARING MANUFACTURING COMPANY, OF CHICAGO, ILLINOIS, A CORPORATION OF ILLINOIS.

BALL BEARING.

Application filed June 23, 1924. Serial No. 721,807.

*To all whom it may concern:*

Be it known that I, CLARENCE T. OLSON, a citizen of the United States, residing at Chicago, in the county of Cook and State of Illinois, have invented a new and useful Improvement in Ball Bearings, of which the following is a specification.

This invention relates to ball bearings and more particularly to means for securing the inner race-member of a ball bearing from turning on a shaft passing therethrough while the outer race-member is held in a housing in a well known manner. This housing may be used as a hanger box which ordinarily encloses two bearings.

The invention is fully described in the following specification and shown in the accompanying drawings, in which:

Figure 1 is a partial horizontal section through a hanger box embodying the invention;

Fig. 2 is a similar view of a modified form of the same; and

Figures 3 and 4 are transverse sections on the lines 3 and 4 respectively of Figs. 1 and 2.

In Figs. 1 and 3 is shown an embodiment of the device as applied to a radial ball bearing having inner and outer race-members 10 and 11 with a set of balls or other anti-friction members rolling in suitable raceways therein.

The inner race-member 10 is loosely mounted upon a shaft 13 which is usually made of cold rolled steel. The inner race-member is preferably wider than the outer race-member 11 so as to project beyond it as shown in Fig. 1 and has an eccentric groove 14 formed therein, which is adapted to hold a split ring 15, the outer surface of which will therefore be eccentric to the shaft 13.

A collar 16 is placed on the shaft 13 adjacent the inner race-member 10 and is secured upon the shaft by means of a set-screw 17. This collar has a flange 18 which has a bore 19 which is eccentric to the axis of this shaft 13 but concentric with the outer surface of the ring 15, which it loosely surrounds.

It will be understood from the foregoing that with the collar 16 secured to the shaft, any rotatable movement of the inner race-member 10 will cause the ring 15 and the bore 19 to move so as to be eccentric to each other, thereby bringing them into engagement and preventing further movement of the inner race-member 10.

The outer race-member 11 is secured in a bore 20 in the housing 21 by means of a cover 22 which is screwed thereto. The end of the housing 21, and the outer surface 23 of the overhanging flange is concentric with the axis of the shaft 13, and upon this bears a felt washer 24 which is carried in a groove in the cover 22 so as to prevent dust and moisture entering the hanger box.

This device supplies a simple and effective means for preventing rotation and hence undue wear between the shaft 13 and the inner race-member 10.

In Figs. 2 and 4 is shown a modified form of the device in which the inner race-member 25 is provided at its outer end with a reduced eccentric end 26 about which is placed a complementary eccentric flange 27 on the collar 28. In this construction as in the one previously described, any movement of the inner race-member 25 relative to the collar 28 will cause the two engaging eccentric surfaces, both of which are mounted upon the shaft 29, to lock thereby preventing further rotation of the inner race-member 25 with respect to the shaft.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In combination, an anti-friction bearing having inner and outer race-members and anti-friction elements therebetween, a shaft passing through said inner race-member, and a member adapted to be secured to said shaft adjacent the inner race-member and having a flange overlying a part of said inner race-member, said flange and part having contiguous concentric surfaces which are eccentric to said shaft whereby the inner race-member is prevented from turning on said shaft.

2. In combination, an anti-friction bearing having inner and outer race-members and anti-friction elements therebetween, a shaft passing through said inner race-member, a member adapted to be secured to said shaft adjacent the inner race-member and having a flange overlying a part of said inner race-member, said flange having an inner surface eccentric to the shaft, a groove in the end of the inner race-member, a snap ring in said groove concentric with the inner surface of said flange whereby the inner race-member is prevented from turning on said shaft.

CLARENCE T. OLSON.